United States Patent  
Takamatsu (10) Patent No.: US 7,951,478 B2
(45) Date of Patent: May 31, 2011

(54) BATTERY PACK (75) Inventor: Toshifumi Takamatsu, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 1086 days.

(21) Appl. No.: 11/783,400

(22) Filed: Apr. 9, 2007

(65) Prior Publication Data
US 2007/0238016 A1 Oct. 11, 2007

(30) Foreign Application Priority Data

Apr. 10, 2006 (JP) ................. 2006-108105

(51) Int. Cl.
*H01M 10/50* (2006.01)
(52) U.S. Cl. ......... 429/120; 429/148; 429/152; 429/153
(58) Field of Classification Search .......... 429/160, 429/159, 158, 157, 149, 148, 152, 120, 99, 429/100, 153; 180/68.5, 65.31
See application file for complete search history.

(56) References Cited

U.S. PATENT DOCUMENTS

2004/0021442 A1* 2/2004 Higashino ............... 320/112
2004/0038124 A1* 2/2004 Hisamitsu et al. ........... 429/161

FOREIGN PATENT DOCUMENTS

JP 2005-116440 4/2005

* cited by examiner

*Primary Examiner* — Raymond Alejandro
(74) *Attorney, Agent, or Firm* — Foley & Lardner LLP (57) ABSTRACT A battery pack includes battery modules; battery module stacked members including the stacked battery modules; a battery module group including the battery module stacked members arranged in a plane; and a lower plate arranged to hold the battery module group. The lower plate includes a main body made from a resin, the main body supporting the battery module stacked members arranged in parallel, and including mounting surfaces each of which one of the battery module stacked members is mounted on; and metal frames each inserted and molded in one of the mounting surfaces, the metal frames being arranged in an arrangement direction of the battery module stacked members, and electrically insulated with each other.

5 Claims, 8 Drawing Sheets

BATTERY PACK

BACKGROUND OF THE INVENTION

This invention relates to a battery pack including a lower plate to hold battery module stacked members including stacked battery modules, and disposed in a plane.

A Published Japanese Patent Application Publication No. 2005-116440 shows a battery pack including stacked thin batteries (cells), or including battery module stacked members having stacked battery modules each having a plurality of stacked thin batteries. The stacked thin batteries or the battery module stacked members are arranged on a plate (hereinafter, referred to a lower plate) in a plane. Electric terminals of the thin batteries or electric terminals of the battery modules are electrically connected with each other.

In this battery pack, in a case of the lower plate made from a metal, the battery module stacked members may be unintentionally connected with each other (outer short-circuit) through the lower plate.

For improving this, it is conceivable that the lower plate is formed from insulative resin. However, in a case of the battery pack for the vehicle, there is necessary for large area. The lower plate made from the resin has a rigidity smaller than a rigidity of the lower plate made from the metal, and accordingly enough rigidity may not be ensured. In order to attain desired rigidity, the thickness of the lower plate is increased, and accordingly it is problematic to increase the weight and the size of the battery pack.

SUMMARY OF THE INVENTION

It is, therefore, an object of the present invention to provide a battery pack provided with a lower plate having enough rigidity to ensure insulation between inside and outside of the battery pack.

According to one aspect of the present invention, a battery pack comprises: battery modules; battery module stacked members including the stacked battery modules; a battery module group including the battery module stacked members arranged in a plane; and a lower plate arranged to hold the battery module group, the lower plate including: a main body made from a resin, the main body supporting the battery module stacked members arranged in parallel, and including mounting surfaces each of which one of the battery module stacked members is mounted on; and metal frames each inserted and molded in one of the mounting surfaces, the metal frames being arranged in an arrangement direction of the battery module stacked members, and electrically insulated with each other.

DETAILED DESCRIPTION OF THE INVENTION

Hereinafter, an embodiment of the present invention will be illustrated with reference to the drawings.

Figure 1:
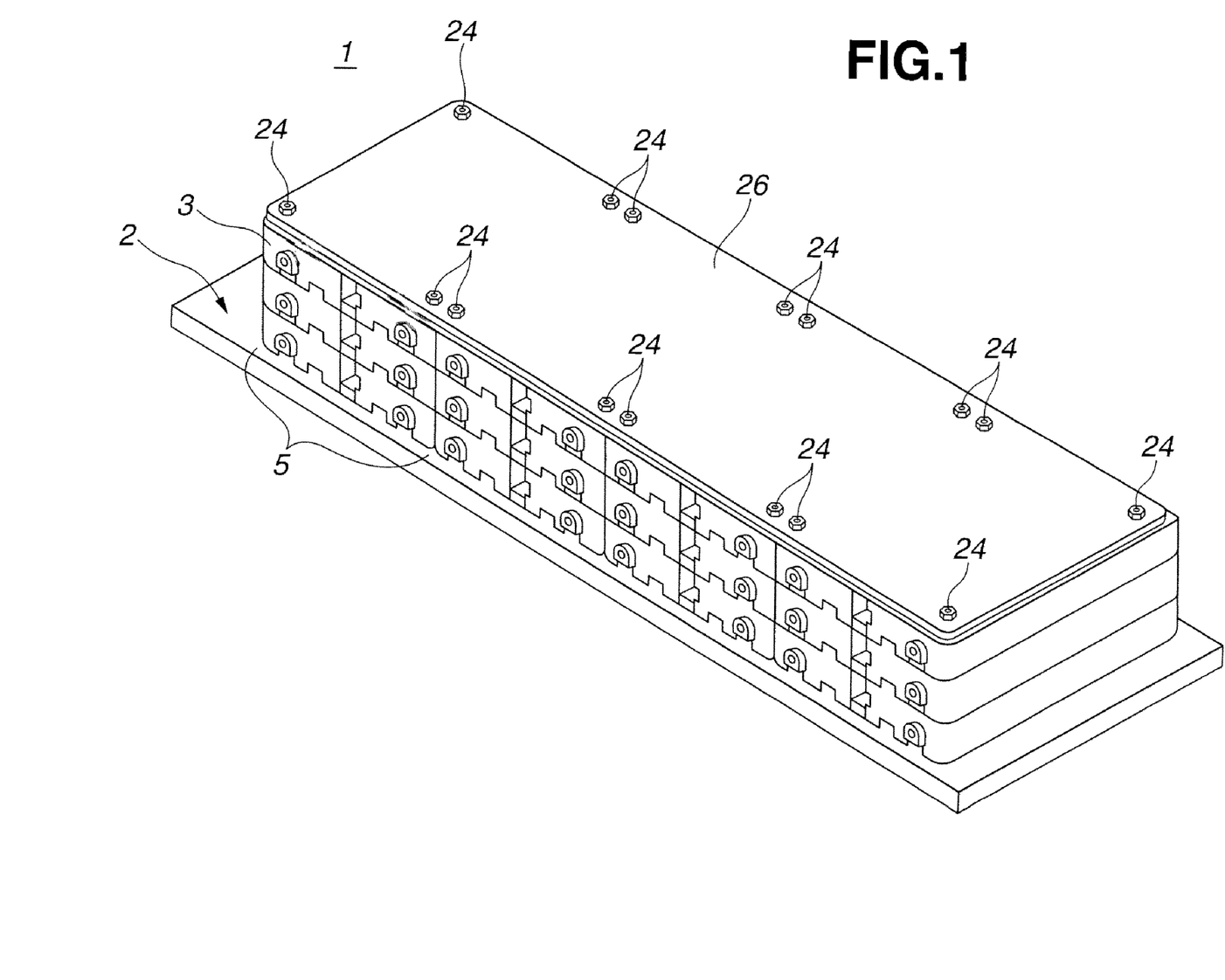
FIG. 1 is a perspective view showing a battery pack using a lower plate according to an embodiment of the present invention.
Figure 2:
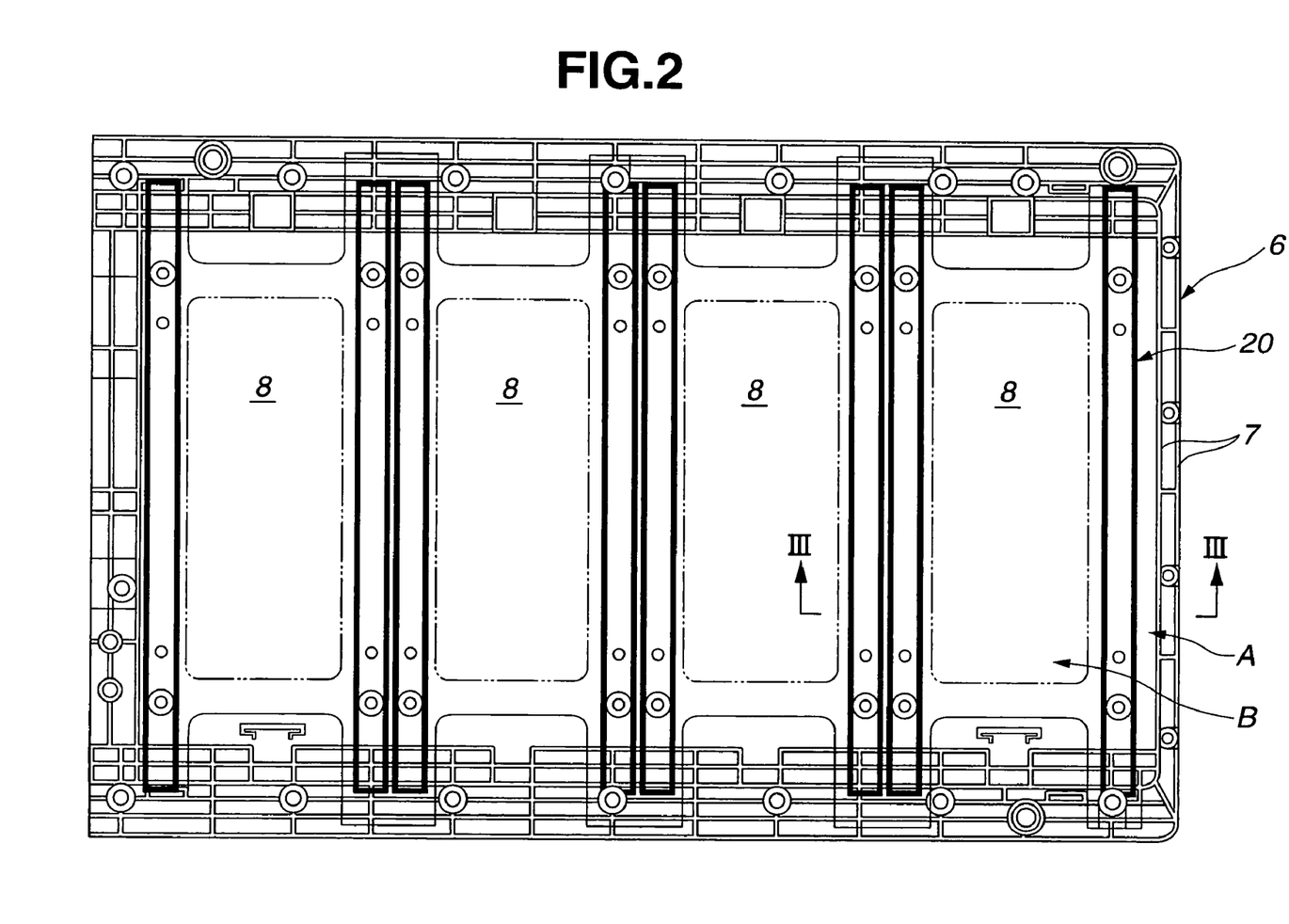
FIG. 2 is a plan view showing the lower plate of FIG. 1.
Figure 3:
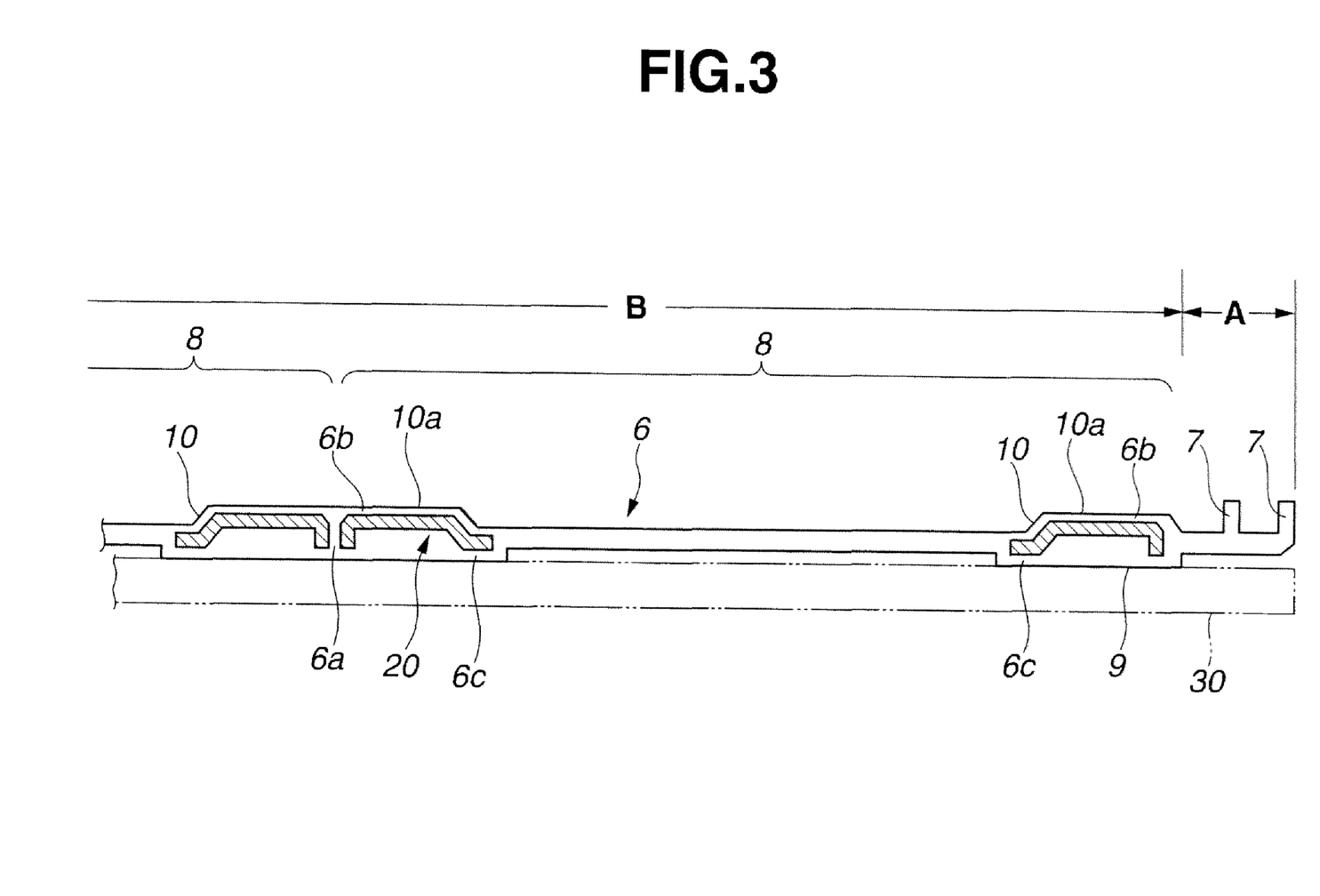
FIG. 3 is a sectional view taken along a section line III-III of FIG. 2.
Figure 9:
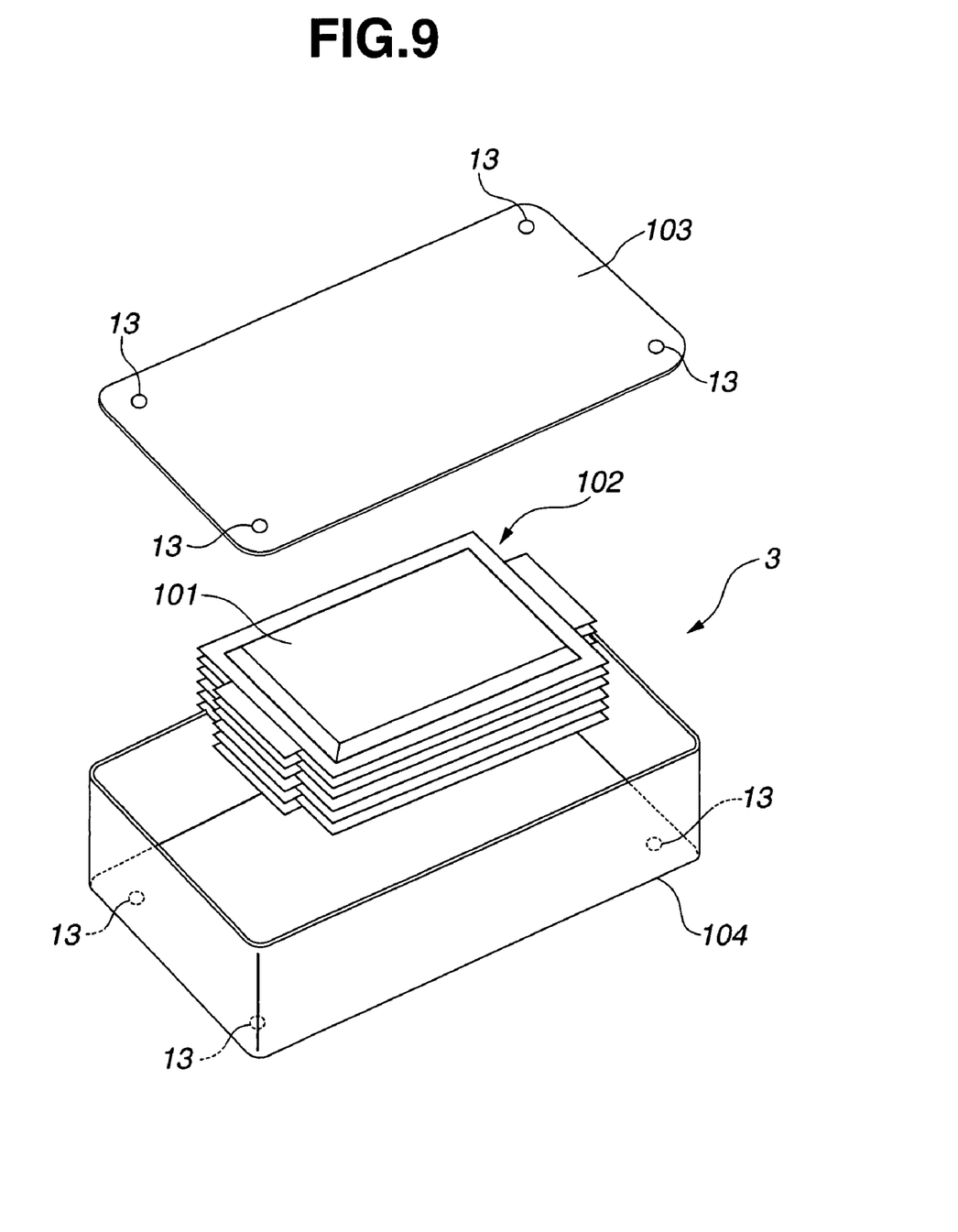
FIG. 9 is an exploded perspective view showing a battery module.

FIG. 1 is a perspective view showing a battery pack using a lower plate according to the embodiment of the present invention. FIG. 2 is a plan view showing the lower plate according to the embodiment of the present invention. FIG. 3 is a sectional view taken along a section line III-III of FIG. 2. FIG. 9 is an exploded perspective view showing a battery module.

A battery pack or assembled battery as shown in FIG. 1 includes a plate-shaped lower plate 2, and a plurality of battery modules 3 stacked on lower plate 2. Each of battery modules 3 is a unit including a plurality of batteries (cells) and a case which is housing the plurality of batteries. The plurality of the batteries in one battery module 3 are electrically connected in parallel with and/or in series with each other, and output a predetermined electric current or a predetermined voltage from output terminals of each battery module 3. These battery modules 3 are connected in series with or in parallel with each other, and accordingly battery pack 1 can obtain desired electric current, desired voltage or desired capacity (EX; electric current, voltage and capacity which is necessary for a motor of electric vehicle or Hybrid electric vehicle) As shown in FIG. 9, each of battery modules 3 includes a battery unit 102 having a plurality of flat batteries 101 stacked with each other, and electrically connected with each other. This battery unit 102 is received in a case having insulating surfaces, to form one battery module 3. This battery module 3 includes a case upper surface (case upper lid) and a case lower surface (case lower lid) which are formed with through holes 13 penetrating to the outside. Each of through-bolts 25 penetrates through one through hole 13 through battery module 3 in an upward and downward directions.

On lower plate 2, there are arranged module stacked members 5 each including three battery modules 3 stacked in the upward and downward directions (vertical direction). In a plane, battery module stacked members 5 are arranged in a row in a longitudinal direction, and arranged in four rows in a lateral direction.

Lower plate 2 includes a main body 6 which is made from an insulating resin (hereinafter, referred to resin), and which is a lower plate main body, and metal frames 20 which are frame-shaped metal components, and which are inserted into this main body 6.

As shown in FIG. 3, main body 6 includes an outside region A which is a light body formed by many ribs 7 set on the plane, and an inside region B located inside outside region A. In inside region B, there are provided four mounting surfaces 8 arranged in the lateral direction. Each of battery module stacked members 5 is mounted on one of four mounting surfaces 8. On a lower surface of main body 6, there are formed mounting surface 9 mounted to a vehicle body 30 located below a floor of the vehicle. Each of four mounting surfaces 8 includes raised portions 10 of main body 6 which are located on the both sides of that mounting surface 8. Each of raised portions 10 includes a top portion 10a for holding one battery module stacked member 5.

Figure 4:
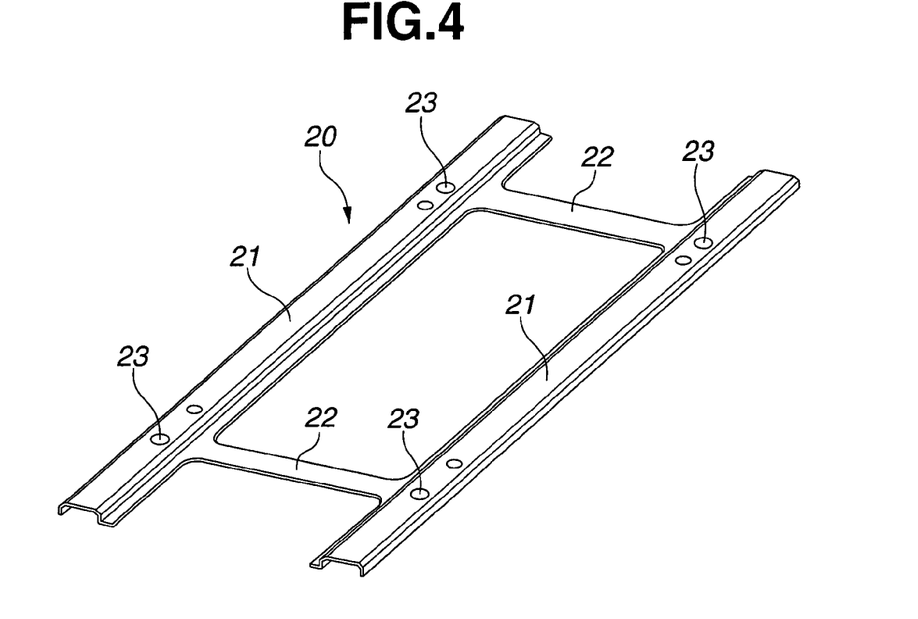
FIG. 4 is a perspective view showing a metal frame of the lower plate of FIG. 2.

Each of metal frames 20 is inserted in one of mounting surfaces 8 of main body 6 on which battery module stacked member 5 is mounted, to reinforce mounting surfaces 8. As shown in FIG. 4, each of metal frames 20 includes two longitudinal members 21 which is located apart from each other by a distance corresponding to a width of one battery module stacked member 5, and a plurality of lateral members 22 connecting these two longitudinal members 21. These longitudinal members 21 of metal frame 20 are bent downward for increasing strength. Each of lateral members 22 is connected to lowest portions of the bent portions of longitudinal members 21. Longitudinal members 21 of metal frame 20 include through holes 23 each located at a portion which is connected with one lateral member 22. Through-bolt 25 (FIG. 6) is inserted through one through hole 23 at assembly operation.

Figure 5:
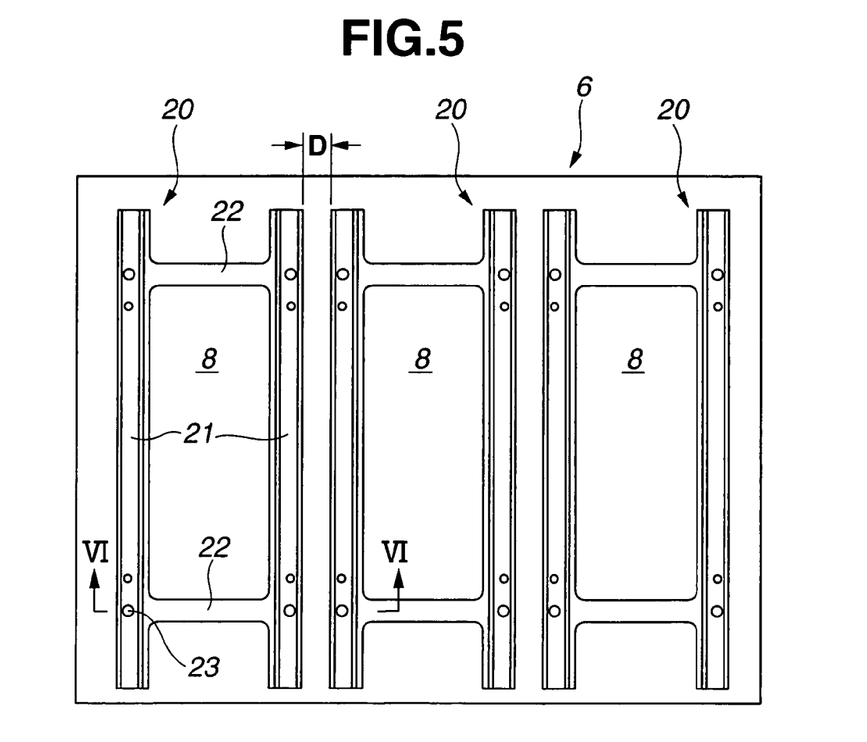
FIG. 5 is a diagrammatic view showing a part of the lower plate of FIG. 2.
Figure 6:
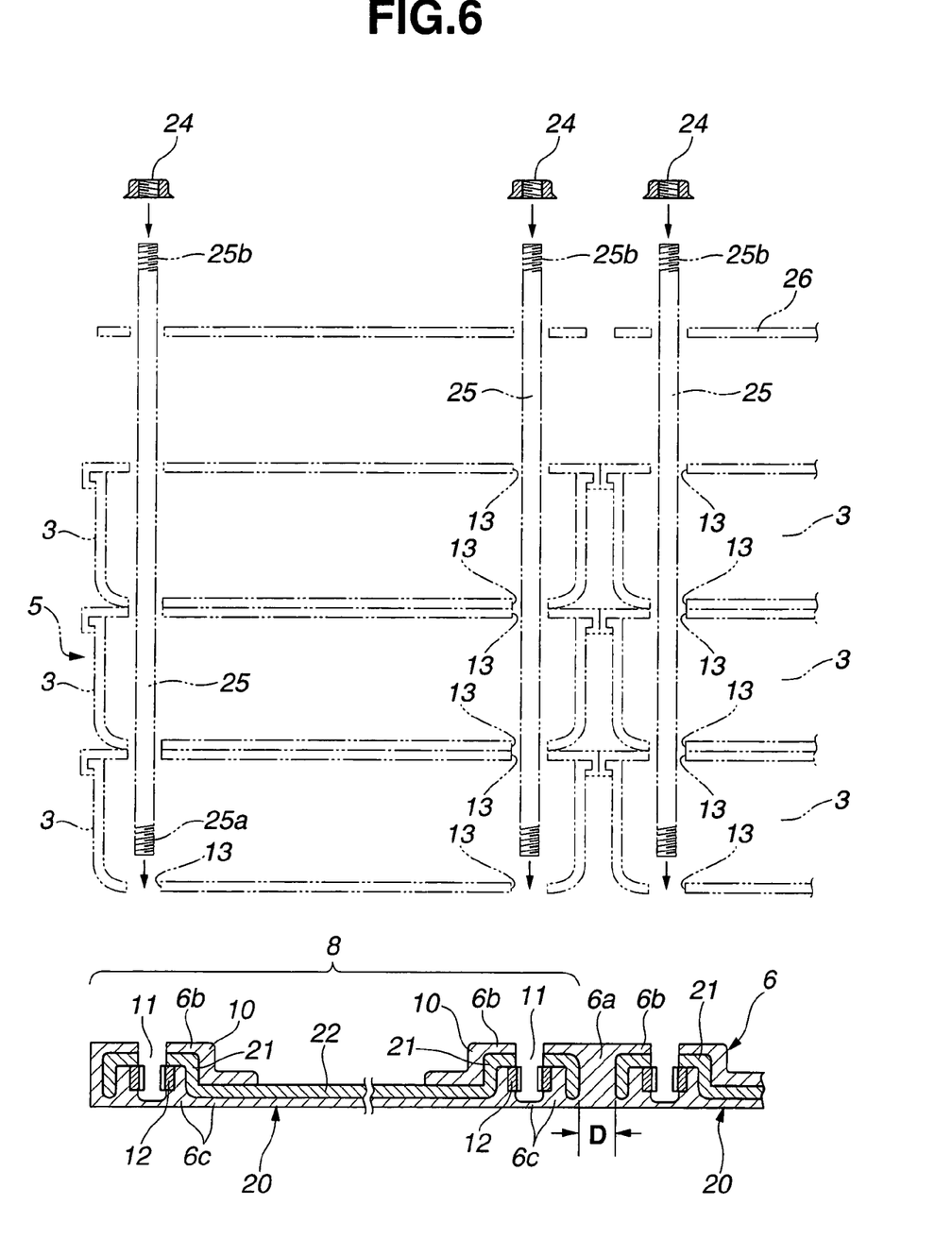
FIG. 6 is a sectional view taken along a section line VI-VI of FIG. 5.

FIG. 5 is a view showing a part of FIG. 2 which is simplified. FIG. 6 is a sectional view taken along a section line VI-VI of FIG. 5. As shown in FIG. 5, four metal frames 20 (only three metal frames 20 shown in FIG. 5) are inserted into main body 6, and arranged with a distance D in the arrangement direction of battery module stacked members 5. In this case, metal frames 20 are disposed to position longitudinal members 21 of metal frame 20 in raised portions 10 of main body 6 as shown in FIG. 6.

As shown in FIG. 6, longitudinal members 21 of metal frames 20 which are adjacent to each other in one raised portion 10 of main body 6 are located apart from each other by the above-described distance D. Between these longitudinal members 21 of metal frames 20 which are adjacent to each other in the one raised portion 10, there is a resin portion 6a. Accordingly, it is possible to surely break conduction through lower plate 2, and to eliminate outer short-circuit.

Each of longitudinal members 21 of metal frames 20 includes an upper surface confronting battery module 3, and a lower surface opposite to the upper surface. The upper surface of each longitudinal member 21 is covered with a resin portion 6b of main body 6, and the lower surface of each longitudinal member 21 is covered with a resin portion 6c of main body 6. Accordingly, it is possible to prevent metal frame 20 from being exposed to the outside of battery pack 1, and to ensure insulation (insulation on the upper side) between metal frame 20 and battery modules 3, and insulation (insulation on the lower side) between metal frame 20 and vehicle body 30. Besides, a top surface of resin portion 6b (top portion 10a of raised portion 10) determines height of mounting surface 8.

However, the resin portion is not provided in an intermediate portion between adjacent two of raised portions 10 and 10 in each mounting surface 8. The upper surface of metal frames 20 are exposed at portions corresponding to lateral members 22, and all surfaces including the upper and lower surfaces are exposed at portions other than lateral members 22 between adjacent two of raised portions 10 and 10. Consequently, metal frames 20 of the metal components are exposed to cooling passages 15 (FIG. 7) within battery pack 1 as described later, to improve cooling efficiency of battery pack 1.

Each of raised portions 10 of main body 6 includes bottomed holes 11. An end of through-bolt 25 is inserted into one bottomed hole 11. Each of bottomed holes 11 penetrates from above through one resin portion 6b and one longitudinal member 21, to remain resin portion 6c at a lower end of bottomed hole 6b. Moreover, a nut 12 is embedded in a lower end portion of each bottomed hole 11 of raised portion 10, for tightening a lower end portion of through-bolt 25. Accordingly, each through-bolt 25 is inserted through one through hole 13 of battery module stacked member 5 (the through holes provided in same position of the battery modules stacked in three layers) as shown in FIG. 6, and the lower end portion of through-bolt 25 is inserted into bottomed hole 11. Then, thread grooves 25a provided on an outer circumference of the lower end portion of each through-bolt 25 is screwed with nut 12, and consequently through-bolt 25 is set on lower plate 2.

Four battery module stacked members 5 are mounted on lower plate 2 by through-bolts 25 set on lower plate 2, and then covered with an upper plate 26 to cover all battery module stacked members 5 as shown in FIG. 1. Nut 24 is mounted, from above upper plate 26, on thread grooves 25b (FIG. 6) of an upper end portion of through-bolt 25. Consequently, all battery module stacked members 5 are fixed to lower plate 2.

Figure 7:
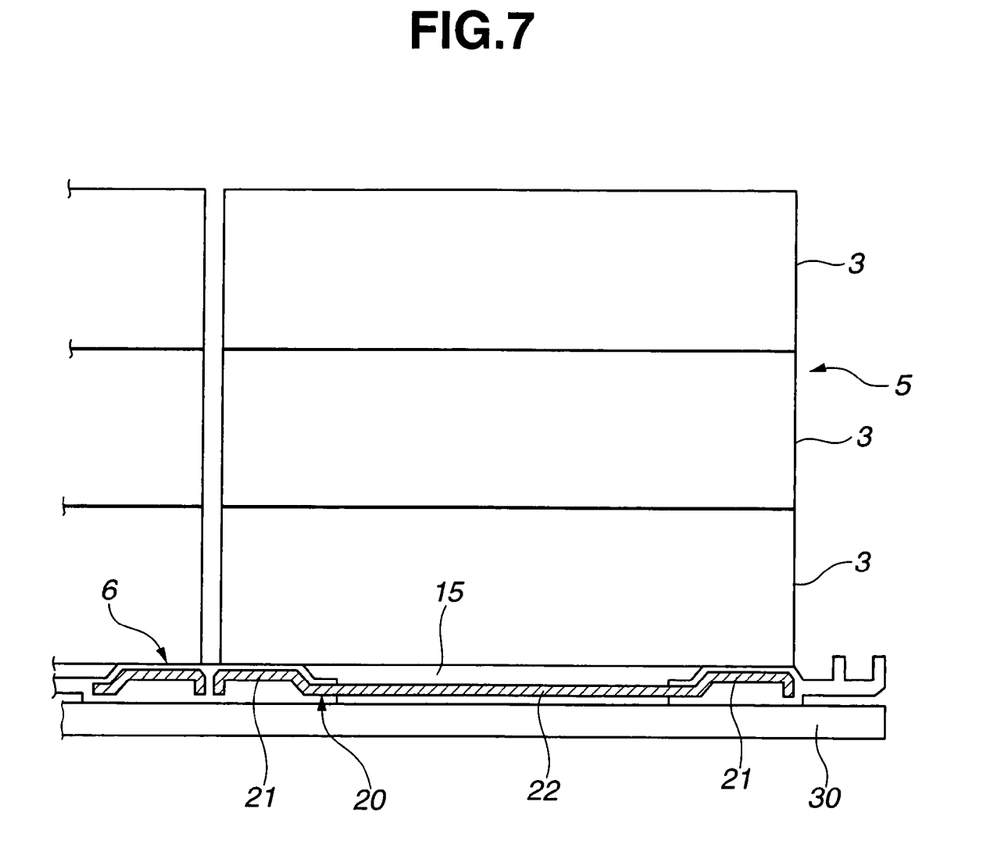
FIG. 7 is a sectional view showing a state that the battery pack held by the lower plate of FIG. 2 is mounted on a vehicle body.

After battery module stacked members 5 of battery pack 1 are retained by lower plate 2, battery pack 1 is disposed in a space below the floor of the vehicle (not shown), and mounted on vehicle body 30, as shown in FIG. 7. FIG. 7 shows a section of lower plate 2 that lateral member 22 of metal frame 20 passes, like FIG. 6.

In this example, between bottom surfaces of battery module stacked members 5 and lower plate 2, there are formed cooling passages 15 that cooling air flows. Lateral members 22 of metal frame 20 are exposed to these cooling passages 15. That is, each of cooling passages 15 is positioned below one battery module stacked member 5, and lateral members 22 of metal frames 20 are exposed to these cooling passages 15. Accordingly, it is possible to cool metal frame 20 in addition to the bottom surfaces of battery module stacked members 5, and thereby to cool entire battery module stacked members 5 through through-bolts 25 by cooling metal frame 20. Consequently, it is possible to attain a structure of the lower plate to improve the cooling efficiency of battery pack 1.

Figure 8:
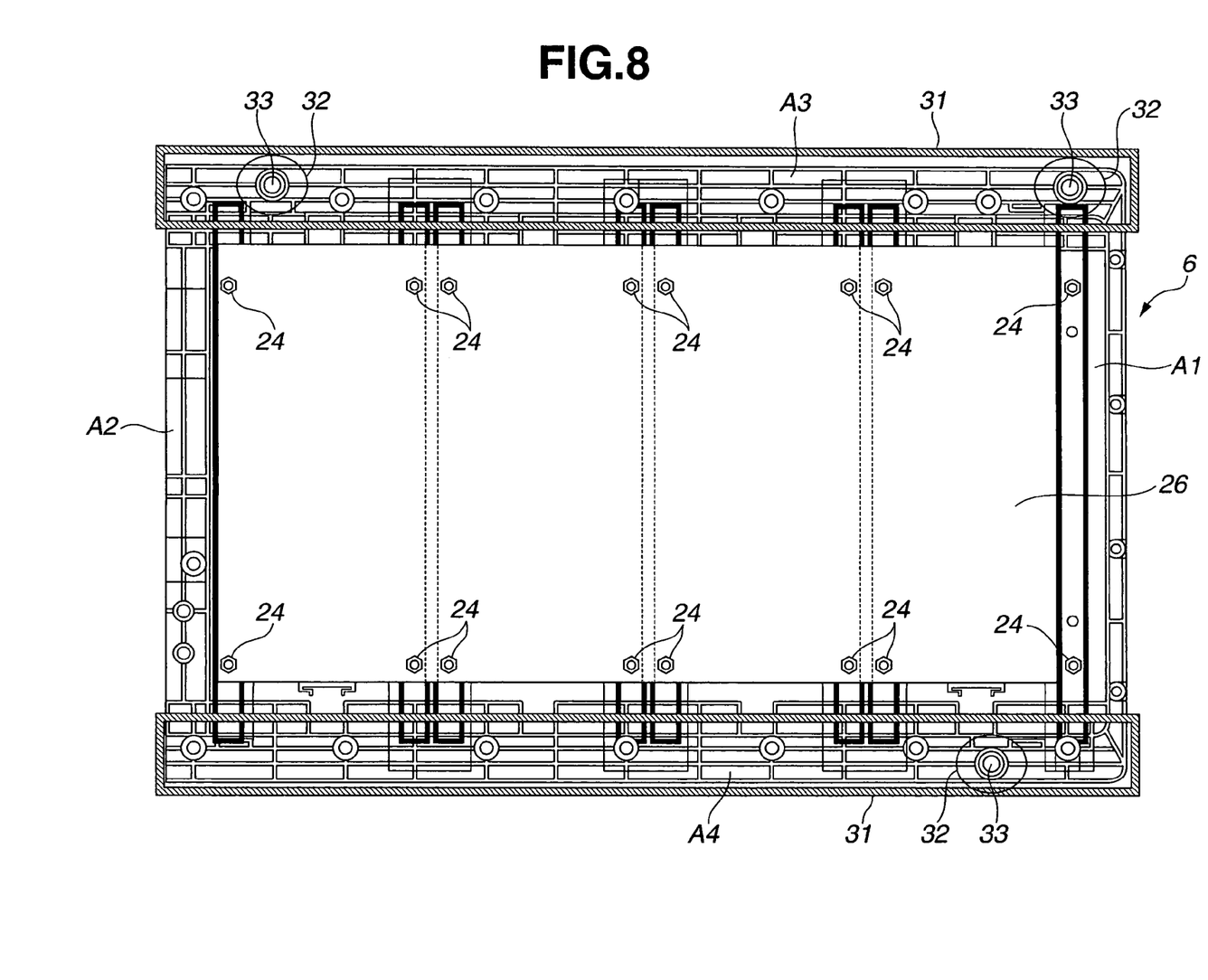
FIG. 8 is a plan view showing a state that the battery pack including the module stacked members mounted to the lower plate of FIG. 2 is mounted on the vehicle body by using fixing brackets.

FIG. 8 is a view showing a state that battery pack 1 including battery module stacked members 5 mounted to lower plate 2 according to the embodiment of the present invention is mounted on the vehicle by using brackets 31 for fixing to the vehicle.

In FIG. 8, main body 6 of lower plate 2 has a rectangular shape, and accordingly outside region A includes short side region A1 and A2, and long side regions A3 and A4. In long side region A3 on the upper side in FIG. 8 and long side region A4 on the lower side in FIG. 8, there are disposed fixing brackets 31 to fix battery pack 1 to the vehicle, when battery pack 1 is mounted to the vehicle. These fixing brackets 31 have a lateral length (length in right and left directions in FIG. 8) to cover four battery module stacked members 5 arranged in four rows in the lateral direction, and a width (length in upward and downward directions in FIG. 8) which is identical to long side regions A3 and A4, or a width which is slightly longer than long side regions A3 and A4.

Longitudinal members 21 of metal frames 20 extend to connect long side regions A3 and A4 located on the upper and the lower side in FIG. 8. That is, longitudinal members 21 of metal frame 20 is set to a length to connect between fixing brackets 31 located on long side regions A3 and A4, and to serve as a lateral member of a curb shape.

Therefore, brackets 31 for fixing to the vehicle is mounted on long side regions A3 and A4 of main body 6, and it is possible to hold both end portions of longitudinal members 21 of four metal frames 20 commonly. Moreover, each of long side regions A3 and A4 of main body 6 includes a mounting hole 33 or a plurality of mounting holes 33 located in a region not to cause interference with metal frames 20 of the metal components, and located on fixing portions 32 to fix to the vehicle. The entire battery pack 1 is mounted to vehicle body 30 by using mounting holes 33 and brackets 31 for fixing to the vehicle.

At the mounting operation of battery pack 1 to the vehicle, metal frames 20 and brackets 31 for fixing to the vehicle form the curb shape, and it is possible to increase the rigidity at the mounting to the vehicle. Fixing portions 32 at the fixing to the vehicle is set to a region not to cause the interference with metal frame 20 of the metal component, and it is possible to ensure the insulation of the inside and the outside of the battery pack.

Besides, the battery module may be formed by receiving a plurality of batteries in the case, or by receiving a battery in the case. The battery module is not limited to the number of the batteries. This invention is applicable to the battery pack mounted on the vehicle and so on.

In the battery pack according to the embodiment of the present invention, the battery pack includes battery modules; the battery module stacked members including the stacked battery modules; the battery module group including the battery module stacked members arranged in a plane; and the lower plate arranged to hold the battery module group, the lower plate including: the main body made from the resin, the main body supporting the battery module stacked members arranged in parallel, and including mounting surfaces each of which one of the battery module stacked members is mounted on; and the metal frames each inserted and molded in one of the mounting surfaces, the metal frames being arranged in an arrangement direction of the battery module stacked members, and electrically insulated with each other.

The battery pack according to the embodiment of the present invention includes the metal frames each inserted and molded in one mounting surface mounted with the battery module stacked member, in the resin main body mounted with the battery module stacked members arranged in parallel. The metal frames are disposed in the arrangement direction of the battery module stacked members, in a state to be electrically insulated with each other. Accordingly, it is possible to surely prevent the short circuit (outer short circuit) that the battery module stacked members are conducted with each other through the lower plate. The lower plate according to the present invention is superior in the rigidity to the lower plate made from the simple resin. There is no need for special insulating members and large space for the insulation, dislike the lower plate made from the simple metal components. Accordingly, it is possible to decrease the cost and the size.

This application is based on a prior Japanese Patent Application No. 2006-108105. The entire contents of the Japanese Patent Application No. 2006-108105 with a filing date of Apr. 10, 2006 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A battery pack comprising:
   battery module stacked members, the battery module stacked members including at least one battery module, wherein the battery module has a battery in a case; and
   a lower plate configured to hold the battery module stacked members on a mounting surface, the lower plate including a main body made from a resin and metal frames in the main body, wherein adjacent frames are electrically insulated from each other by a gap, at least a portion of the gap lying between adjacent battery module stacked members wherein each of the metal frames includes longitudinal members located apart from each other by a distance corresponding to a width of one of the battery module stacked members, and lateral members connecting the longitudinal members, wherein the battery pack further comprises cooling passages located between the battery module stacked members and the lower plate, wherein at least a part of the lateral members is exposed to the cooling passages, and wherein the battery pack is mounted in a vehicle and the main body includes fixing portions to fix the main body to the vehicle, which are located outward from the metal frames.

2. The battery pack as claimed in claim 1, wherein each of the longitudinal members includes a first surface confronting the battery module stacked members, and a second surface opposite to the first surface, wherein the first surface and the second surface are covered with the resin of the main body.

3. The battery pack as claimed in claim 1, wherein each lateral member includes a first surface confronting the battery module stacked members and a second surface opposite to the first surface, wherein the first surface is exposed to the cooling passages and the second surface is covered with the resin.

4. The battery pack as claimed in claim 1, wherein the main body includes raised portions on both ends of each mounting surface, wherein each of the longitudinal members is arranged at one of the raised portions.

5. The battery pack as claimed in claim 4, wherein adjacent longitudinal members of adjacent metal frames are arranged at one of the raised portions and located apart from each other by the gap, wherein resin is provided between the adjacent longitudinal members.

* * * * *